Figure 1:
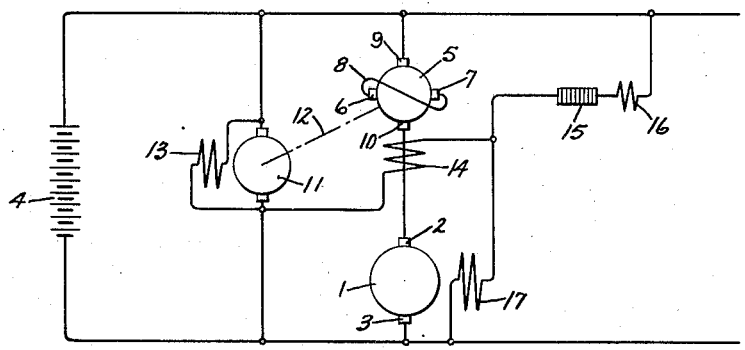

July 5, 1949.   A. TUSTIN   2,474,872
ELECTRICAL SYSTEM
Filed Dec. 7, 1945

Inventor:
Arnold Tustin,
by *Prancell S. Nack*
His Attorney.

Patented July 5, 1949

2,474,872

UNITED STATES PATENT OFFICE 2,474,872

ELECTRICAL SYSTEM

Arnold Tustin, Sheffield, England, assignor, by mesne assignments, to General Electric Company, a corporation of New York Application December 7, 1945, Serial No. 633,447
In Great Britain May 31, 1941

Section 1, Public Law 690, August 8, 1946
Patent expires May 31, 1961

4 Claims. (Cl. 318—331)

My invention relates to variable speed electrical motor systems in which it is desired to maintain a substantially constant torque on the motor throughout a range of speed.

An object of my invention is to provide an improved electrical system utilizing a variable speed motor adapted to supply a substantially constant output torque.

Another object of my invention is to provide an improved electrical system utilizing a variable speed motor and dynamoelectric machine for controlling the current through the motor armature for maintaining a substantially constant motor output torque throughout a range of operating speed.

Further objects and advantages of my invention will become apparent and my invention will be better understood from the following description referring to the accompanying drawing, and the features of novelty which characterize my invention will be pointed out with particularity in the claims annexed to and forming part of this specification.

Electrical systems have been provided in the past in which a metadyne or similar machine has been used as a power converter or rotary transformer for supplying energization to a variable speed motor for obtaining a desired speed torque characteristic. Such a system is described in Patent 1,987,417, Pestarini, January 8, 1945. According to my improved electrical system, a variable speed electric motor equipment is utilized to produce a substantially constant output torque from energy which is derived from a substantially constant voltage source of power in which a metadyne dynamoelectric machine is connected in series with the armature of the motor, such that the motor armature current remains substantially constant and the field of the motor is also adapted to be regulated to a substantially constant value. In this manner, the motor output torque will remain substantially constant, as the armature current and the motor excitation will both be maintained at substantially constant values throughout the range of operating speed of the motor. In order to utilize the metadyne machine at its maximum efficiency and to utilize such a machine of the minimum size, it is desirable that the back electromotive force of the motor should be substantially equal to the voltage of the source of power supply at the midpoint in the speed range of the motor, such that the voltage buck or boost supplied by the metadyne in maintaining the motor armature current will be substantially equal for speed variations on either side of the midpoint of the motor speed range. This invention is particularly suitable for driving equipment, such as oil pumps of oil servo systems, such that the pressure developed by the pump will remain substantially constant irrespective of the rate of flow of oil therethrough.

Figure 2:
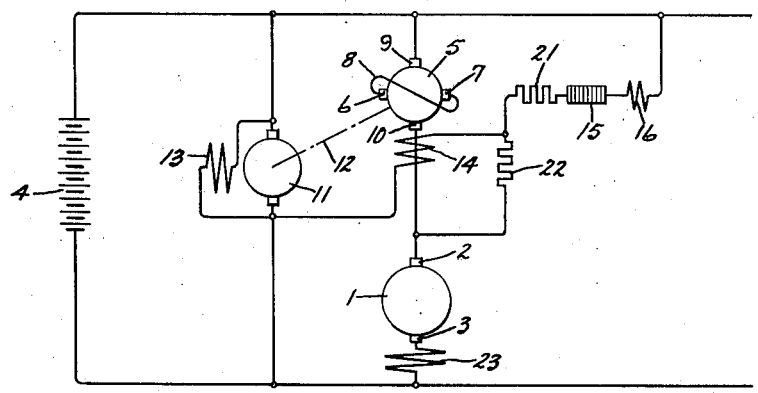
Figure 3:
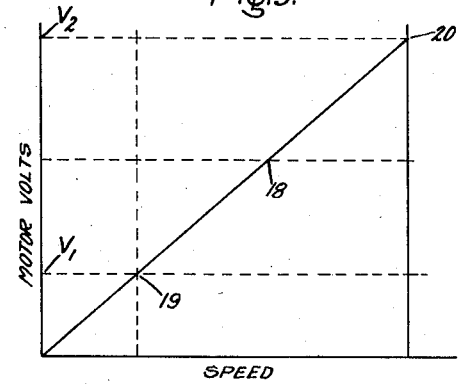

In the drawing, Figs. 1 and 2 are schematic diagrams showing the electrical connection of two embodiments of my invention; and Fig. 3 illustrates the relationship of the voltage across the driving motor to the speed of the motor in order to provide the desired constant output torque of the system.

Referring to the drawing, I have shown in Fig. 1 an electrical system provided with an electric motor having an armature 1 adapted to drive an oil pump, not shown, of the positive displacement type in oil servo systems or for driving any other load device to which a constant or substantially constant torque should be supplied independently of the speed of the pump or other load device. In the illustration, the armature 1 is provided with a set of brushes 2 and 3 which are adapted to connect the armature to a source of power supply, such as a battery 4. In order to maintain the desired armature current, one of the armature brushes is connected in series with a metadyne dynamoelectric machine to the source of power supply. As shown, this metadyne dynamoelectric machine is provided with an armature 5 having a primary set of brushes 6 and 7 which are substantially short circuited by an electrical conductor 8 and is also provided with a set of secondary brushes 9 and 10 to provide a primary circuit and a secondary circuit, respectively, through the winding of the metadyne armature 5. The operation of this type machine is well known and is described in various patents, of which Patent 2,203,544, Pestarini, June 4, 1940, is illustrative. In this figure, the armature 5 of the metadyne machine is adapted to be driven at substantially constant speed by a constant speed electrical driving motor having an armature 11 mechanicallly connected by any suitable coupling 12 to the armature of the metadyne machine and provided with a shunt field exciting winding 13 connected across the motor armature 11 and across the source of electrical power supply 4. In this system, the metadyne machine is provided with a field exciting winding 14 which is adapted to provide a component of excitation along the load axis of the machine for controlling the secondary current of the armature through the secondary brushes 9 and 10 and, therefore, control the current through the armature 1 of the main driving motor. The current through the main driving motor armature 1 can be maintained substantially constant by regulating the energization of the metadyne field exciting winding 14 to a substantially constant value, and in the arrangement shown in this figure, this is obtained by connecting the field exciting winding 14 of the metadyne across the substantially constant voltage source of electrical power supply 4 through a carbon pile regulator 15 having an operating coil 16 connected in series with the carbon pile 15 and the field exciting winding 14. This carbon pile regulator may be of any conventional type in which the pressure on the carbon pile 15 is varied by the coil 16 to provide a comparatively large variation of resistance for relatively small variations of current in the coil 16, whereby the regulator will maintain substantially constant current in the field exciting winding 14 irrespective of fluctuations in the voltage of the source of power supply 4.

In order to obtain a substantially constant torque from the main driving motor, it is also desirable that its excitation should remain substantially constant. In the arrangement shown in this figure, a field exciting winding 17 is adapted to provide the excitation to the armature 1 of this motor, and this field exciting winding is connected across the substantially constant voltage source of electrical power supply 4 through the carbon pile regulator 15 which automatically maintains the current through the field exciting winding 17 substantially constant. In this arrangement, the motor is adapted to operate at a speed such that its back electromotive force equals the voltage of the battery 4 at its normal operating speed, which is about midpoint in its operating speed range. In Fig. 3, this point is indicated at 18 on the curve 19—20 which represents the relationship of the voltage across the armature 1 and the speed of rotation of this armature. In order to utilize the capacity of the machines to their maximum efficiency and to utilize the smallest machines possible for the desired range of operation, the point 18 is substantially midway between the operating points 19 and 20 which represent the limits of the speed range of operation for the motor armature 1. Thus, in order to obtain the speed range from the point 19 to the point 20, the voltage across the armature 1 should vary between the values indicated by the points V₁ and V₂. When the speed of the motor armature 1 is above its midpoint of speed operation, the metadyne machine will produce between its secondary brushes 9 and 10 a voltage which will tend to maintain constant the current through the secondary brushes and the armature of the motor 1, and this voltage will act in the same direction as the voltage of the battery 4, whereas when the motor armature 1 operates at a speed below its midpoint 18 of the speed range of the motor, the metadyne machine will produce between the secondary brushes 9 and 10 a voltage which acts in opposition to that of the battery 4, and under these conditions, the metadyne armature 5 will drive its driving motor armature 11, such that this driving motor will operate as a generator and return current to the line to which it is connected.

In Fig. 2, I have shown another electrical system which is adapted to provide the same desirable results as that shown in Fig. 1 and, in addition, in this arrangement, the driving motor is adapted to compensate for the inherent fall of motor torque with motor speed due to the inherent variation of the metadyne current with variations of the voltage at the secondary brushes 9 and 10 of the metadyne machine. Thus, when the metadyne secondary voltage acts in the same direction as the current flowing through the secondary brushes of the metadyne to the main driving motor armature 1; that is, when the motor speed is such that the voltage across the main driving motor armature 1 is greater than that of the battery 4, the current through the metadyne and motor circuit falls with increase of motor speed and voltage, and similarly, when the motor speed is such that the voltage across the main driving motor armature 1 is less than that of the battery 4, the current in this circuit rises with a fall in the motor speed and voltage. Therefore, there is a slight increase and decrease in the main motor torque with speed variations thereof due to the inherent characteristics of the metadyne. In this figure, the same parts of the system are indicated by the same reference numerals as those in Fig. 1, and, in addition, a fixed resistor 21 is connected in series with the metadyne field exciting winding 14 and the carbon pile regulator 15, and another fixed resistor 22 is connected with a brush 2 of the main drive motor armature 1 and to the connection point between the metadyne field exciting winding 14 and the first fixed resistor 21. In the operation of this system, the carbon pile regulator 15 will automatically operate as in the arrangement shown in Fig. 1 to supply the metadyne machine field exciting winding 14 with a substantially constant current, while a second component of energization for this metadyne field exciting winding 14 is provided through the fixed resistor 22, and this component of energization depends upon the voltage across the main drive motor armature 1 and, therefore, is dependent upon the speed of this motor. This latter component of energization of the metadyne field exciting winding 14 acts in such a sense as to increase or reduce the secondary current of the metadyne with an increase or fall, respectively, of the voltage across the main motor armature 1 and thereby compensates for the inherent variation in the secondary current with variations in the voltage across the armature 1 of the main drive motor. In this instance, the main driving motor is shown as being supplied with a series field exciting winding 23 which provides substantially constant excitation to the main drive motor 1 as it is energized by the substantially constant current which passes through the armature of this motor. This type field exciting winding connection could obviously also be used in the system shown in Fig. 1, or the field exciting windings shown in Fig. 1 could also be used with the system shown in Fig. 2.

While I have described and illustrated particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. An electrical system having a source of power supply, a variable speed motor having an armature and a field exciting winding, a metadyne dynamoelectric machine having an armature with a set of primary brushes and a set of secondary brushes, means including a field exciting winding for said metadyne dynamoelectric machine and an automatic current regulator connected in series with said metadyne field exciting winding for controlling the armature current through said secondary brush set, means for connecting said metadyne secondary brush set in series with said motor armature to said source of power supply, means for driving said metadyne at a substantially constant speed, means for connecting said metadyne driving means across the source of power supply, means for providing substantially constant energization to said motor field exciting winding, and means for supplying to said metadyne field winding a component of excitation proportional to the voltage across the armature of said motor for counteracting the decrease in current through said secondary brushes resulting from variation of the voltage at said secondary brushes comprising a connection from the junction of said metadyne field winding and said regulator to a terminal of said motor armature for connecting said metadyne field winding in parallel with said motor armature, and a resistor included in said connection.

2. An electrical system including a variable speed motor having an armature and a field exciting winding, a metadyne dynamoelectric machine having an armature with a set of primary brushes and a set of secondary brushes, means including a field exciting winding for said metadyne dynamoelectric machine for controlling the armature current through said secondary brush set, to a substantially constant value, means including an automatic current regulator connected to both said metadyne and motor field exciting windings and to a source of power for maintaining substantially constant the current therethrough, means for connecting said metadyne secondary brush set in series with said motor armature to a source of power supply, and means for driving said metadyne at a substantially constant speed.

3. An electrical system having a source of power supply, a variable speed motor having an armature and a field exciting winding, means for energizing said motor field exciting winding and regulating the energizing current therethrough to a substantially constant value, a metadyne dynamoelectric machine having an armature with a set of primary brushes and a set of secondary brushes, a field exciting winding for said metadyne, means for connecting said metadyne field exciting winding to said source of power supply and for automatically regulating the current through said metadyne field exciting winding to maintain a substantially constant current through said secondary brushes, means including said metadyne dynamoelectric machine connecting said motor armature to said source of electrical power supply for maintaining a substantially constant motor armature current throughout the speed range of said motor, and means for supplying to said metadyne field exciting winding a component of excitation proportional to the voltage across the armature of said motor for counteracting the decrease in current through said secondary brushes resulting from variation of the voltage at said secondary brushes.

4. An electrical system having a source of power supply, a variable speed motor having an armature and a field exciting winding, means for energizing said motor field exciting winding, a metadyne dynamoelectric machine having an armature with a set of primary brushes and a set of secondary brushes, a field exciting winding for said metadyne, means for connecting said metadyne field exciting winding to said source of power supply and for automatically regulating the current through said metadyne field exciting winding to maintain a substantially constant current through said secondary brushes, means including said metadyne dynamoelectric machine connecting said motor armature to said source of electrical power supply for varying the voltage applied across said motor armature with the speed of said motor to values of voltage above and below the voltage of said source of power supply as the speed of said motor varies above and below a predetermined value, and means for supplying to said metadyne field winding a component of excitation proportional to the voltage across the armature of said motor for counteracting the decrease in current through said secondary brushes resulting from variation of the voltage at said secondary brushes comprising a connection from a terminal of said metadyne field winding to a terminal of said motor armature for connecting said metadyne field winding in parallel with said motor armature, and a resistor included in said connection.

ARNOLD TUSTIN.

REFERENCES CITED

The following references are of record in the file of this patent:

UNITED STATES PATENTS

| Number | Name | Date |
|---|---|---|
| 1,188,905 | Cumont | June 27, 1916 |